US010913428B2

(12) United States Patent
Dingli

(10) Patent No.: US 10,913,428 B2
(45) Date of Patent: Feb. 9, 2021

(54) VEHICLE USAGE MONITORING

(71) Applicant: Pony AI Inc., Grand Cayman (KY)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/356,699

(22) Filed: Mar. 18, 2019

(65) Prior Publication Data
US 2020/0298801 A1 Sep. 24, 2020

(51) Int. Cl.
B60R 25/30 (2013.01)
B60R 22/48 (2006.01)
B60R 25/104 (2013.01)
G07C 5/08 (2006.01)
G08B 13/196 (2006.01)
B60R 25/10 (2013.01)

(52) U.S. Cl.
CPC ............ *B60R 25/305* (2013.01); *B60R 22/48* (2013.01); *B60R 25/104* (2013.01); *G07C 5/0866* (2013.01); *G08B 13/19647* (2013.01); *B60R 2025/1013* (2013.01)

(58) Field of Classification Search
CPC ..... B60R 25/305; B60R 25/104; B60R 22/48; B60R 2025/1013; G07C 5/0866; G08B 13/19647
See application file for complete search history.

(56) References Cited

U.S. PATENT DOCUMENTS

| 5,680,123 | A | 10/1997 | Lee |
| 6,556,905 | B1 | 4/2003 | Mittelsteadt et al. |
| 7,113,852 | B2 | 9/2006 | Kapadia et al. |
| 9,020,697 | B2 * | 4/2015 | Ricci ................. G06Q 30/0641 701/36 |
| 9,082,239 | B2 * | 7/2015 | Ricci ....................... H04L 67/10 |
| 9,123,186 | B2 * | 9/2015 | Ricci .................... G01C 21/365 |
| 9,175,967 | B2 * | 11/2015 | Abramson ......... G01C 21/3484 |
| 9,235,941 | B2 * | 1/2016 | Ricci .................. B60H 1/00742 |
| 9,290,153 | B2 * | 3/2016 | Ricci ....................... G06F 16/583 |
| 9,646,428 | B1 | 5/2017 | Konrardy et al. |
| 9,691,115 | B2 * | 6/2017 | Abramson ........ H04M 1/72577 |
| 9,714,037 | B2 * | 7/2017 | DeRuyck .............. B60W 40/09 |
| 9,772,196 | B2 * | 9/2017 | Abramson ............. G01C 21/34 |
| 9,883,209 | B2 * | 1/2018 | Ricci .................. G01C 21/3667 |
| 9,986,084 | B2 * | 5/2018 | Abramson ............ H04W 4/029 |
| 10,095,229 | B2 * | 10/2018 | Myers ................ G06K 9/00791 |
| 10,131,362 | B1 * | 11/2018 | Gingrich ................ G08B 23/00 |
| 10,525,934 | B1 * | 1/2020 | Gilbert-Eyres .......... B60R 25/23 |
| 10,576,994 | B1 * | 3/2020 | Higgins ............. G06K 9/00845 |
| 10,657,818 | B2 * | 5/2020 | Dhull ....................... G09F 19/18 |
| 2003/0154009 | A1 * | 8/2003 | Basir ....................... G07C 5/085 701/32.2 |
| 2005/0248283 | A1 * | 11/2005 | Oyaski ..................... B60Q 1/04 315/82 |

(Continued)

Primary Examiner — Brian P Yenke
(74) Attorney, Agent, or Firm — Sheppard Mullin Richter & Hampton LLP

(57) ABSTRACT

Systems, methods, and non-transitory computer readable media may be configured to facilitate monitoring usage of a vehicle. Usage information for a vehicle may be obtained. The usage information may characterize usage of the vehicle by one or more persons. A monitoring event may be detected based on the usage information. Responsive to detection of the monitoring event, one or more lights of the vehicle may be controlled.

17 Claims, 5 Drawing Sheets

(56) References Cited

U.S. PATENT DOCUMENTS

| | | | |
|---|---|---|---|
| 2006/0056663 A1* | 3/2006 | Call | B60R 25/25 382/115 |
| 2008/0152232 A1* | 6/2008 | Skans | G08B 13/196 382/209 |
| 2012/0194356 A1* | 8/2012 | Haines | G08G 1/161 340/933 |
| 2012/0274776 A1* | 11/2012 | Gupta | G08B 13/19641 348/159 |
| 2013/0344859 A1* | 12/2013 | Abramson | H04M 1/72577 455/418 |
| 2014/0309806 A1* | 10/2014 | Ricci | G06Q 10/02 701/1 |
| 2014/0309870 A1* | 10/2014 | Ricci | G06F 3/017 701/36 |
| 2014/0309880 A1* | 10/2014 | Ricci | B60K 35/00 701/36 |
| 2014/0309886 A1* | 10/2014 | Ricci | G06F 16/583 701/41 |
| 2014/0309891 A1* | 10/2014 | Ricci | A61B 7/04 701/48 |
| 2014/0310594 A1* | 10/2014 | Ricci | G06F 16/25 715/702 |
| 2014/0310739 A1* | 10/2014 | Ricci | B60W 50/14 725/28 |
| 2014/0316610 A1* | 10/2014 | Tomita | B60R 25/24 701/2 |
| 2015/0009010 A1* | 1/2015 | Biemer | G06F 21/32 340/5.83 |
| 2015/0141043 A1* | 5/2015 | Abramson | H04W 4/027 455/456.1 |
| 2015/0168174 A1* | 6/2015 | Abramson | G01C 21/3626 701/408 |
| 2015/0168175 A1* | 6/2015 | Abramson | G01C 21/34 701/408 |
| 2015/0172520 A1* | 6/2015 | Lindman | H04N 5/2252 382/190 |
| 2015/0228129 A1* | 8/2015 | Cox | G07C 5/0808 701/29.1 |
| 2015/0232065 A1* | 8/2015 | Ricci | B60W 50/10 701/36 |
| 2015/0241231 A1* | 8/2015 | Abramson | G01C 21/3446 701/534 |
| 2015/0353006 A1* | 12/2015 | Jolda | B60K 37/02 315/77 |
| 2016/0046298 A1* | 2/2016 | DeRuyck | B60W 50/14 340/576 |
| 2016/0075275 A1* | 3/2016 | Salter | H05B 37/0227 315/77 |
| 2016/0205419 A1* | 7/2016 | Ricci | G06F 16/252 725/28 |
| 2017/0066368 A1* | 3/2017 | Miller | B60Q 1/08 |
| 2017/0075701 A1* | 3/2017 | Ricci | H04W 12/0808 |
| 2017/0100975 A1* | 4/2017 | Ruiz | B60D 1/64 |
| 2017/0174157 A1* | 6/2017 | Deljevic | B60L 58/12 |
| 2017/0174158 A1* | 6/2017 | Ding | B60R 16/037 |
| 2017/0190314 A1* | 7/2017 | Ette | B60R 25/2054 |
| 2017/0213459 A1* | 7/2017 | Ogaz | G08G 1/166 |
| 2017/0279957 A1* | 9/2017 | Abramson et al. | H04M 1/6075 |
| 2017/0302785 A1* | 10/2017 | Abramson | H04M 1/72569 |
| 2017/0332458 A1* | 11/2017 | Salter | B60Q 1/04 |
| 2018/0075565 A1* | 3/2018 | Myers | G05D 1/0088 |
| 2018/0113461 A1* | 4/2018 | Potnis | G05D 1/0088 |
| 2018/0215312 A1* | 8/2018 | Salter | F21K 9/64 |
| 2018/0238513 A1* | 8/2018 | Measel | B32B 17/10036 |
| 2018/0356237 A1* | 12/2018 | Abramson | H04W 4/38 |
| 2018/0361915 A1* | 12/2018 | Kuhl | B60Q 1/24 |
| 2019/0137622 A1* | 5/2019 | Lopez-Hinojosa | G01S 13/865 |
| 2019/0139411 A1* | 5/2019 | Dhull | G09F 19/18 |
| 2019/0256045 A1* | 8/2019 | Siaka | B60R 25/403 |
| 2019/0258263 A1* | 8/2019 | Wendel | B60N 2/002 |
| 2019/0275985 A1* | 9/2019 | Turner | E05B 77/00 |
| 2019/0315169 A1* | 10/2019 | Rogness | B60D 1/36 |
| 2019/0349470 A1* | 11/2019 | Abramson | G01C 21/3484 |
| 2020/0001827 A1* | 1/2020 | Shirazi | G08B 13/19695 |
| 2020/0062275 A1* | 2/2020 | Higgins | G06K 9/00845 |
| 2020/0156592 A1* | 5/2020 | Zaharia | B60R 25/104 |
| 2020/0189522 A1* | 6/2020 | An | B60R 25/31 |
| 2020/0207358 A1* | 7/2020 | Katz | G06K 9/00845 |
| 2020/0216078 A1* | 7/2020 | Katz | G06F 3/017 |
| 2020/0302779 A1* | 9/2020 | Dingli | G08C 19/00 |

* cited by examiner

VEHICLE USAGE MONITORING

FIELD OF THE INVENTION

This disclosure relates to approaches for monitoring usage of a vehicle by one or more persons.

BACKGROUND

A light source is required for various monitoring functions inside a vehicle, such as monitoring of passengers by a driver or by/through a camera. However, it may be uncomfortable for passengers to have interior light on while the vehicle is traveling.

SUMMARY

Various embodiments of the present disclosure may include systems, methods, and non-transitory computer readable media configured to facilitate monitoring usage of a vehicle. Usage information for a vehicle may be obtained. The usage information may characterize usage of the vehicle by one or more persons. A monitoring event may be detected based on the usage information. Responsive to detection of the monitoring event, one or more lights of the vehicle may be controlled.

In some embodiments, the monitoring event may include a passenger approaching the vehicle, the passenger entering the vehicle, or the passenger exiting the vehicle.

In some embodiments, one or more cameras of the vehicle may be controlled to capture an image or a video of the monitoring event. The image or the video may be analyzed to perform one or more monitoring functions. The monitoring function(s) may include a passenger identification confirmation, a seatbelt usage confirmation, a passenger entry confirmation, a passenger departure confirmation, or a post-passenger departure cabin check. The post-passenger departure cabin check may include determination of whether one or more objects have been left in the vehicle by the passenger.

In some embodiments, the camera(s) may include a first camera and a second camera. The first camera and the second camera may be positioned within the vehicle such that a first field of view of the first camera includes the second camera and a second field of view of the second camera includes the first camera. A first tampering event for the first camera may be detected based on an image or a video captured by the second camera. A second tampering event for the second camera may be detected based on an image or a video captured by the first camera. Responsive to detection of the first tampering event or the second tampering event, an alert may be generated. Responsive to detection of the first tampering event or the second tampering event, a warning may be provided to a person engaged in the first tampering event or the second tampering event.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
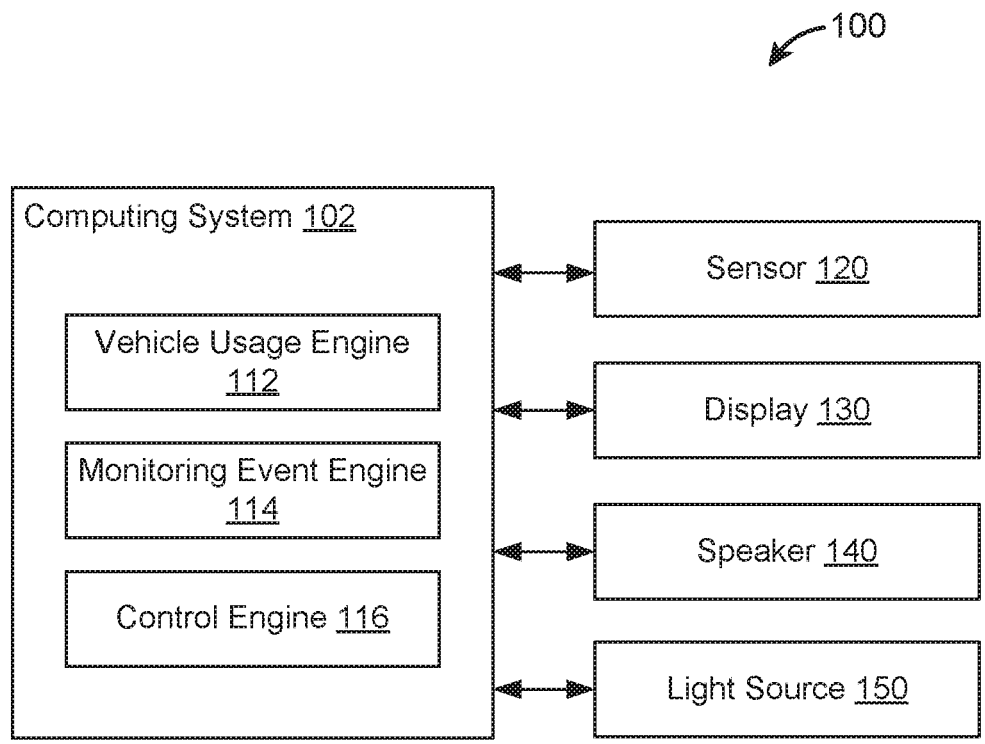
FIG. 1 illustrates an example environment for monitoring usage of a vehicle, in accordance with various embodiments.

In various implementations, usage of a vehicle may be monitored by obtaining usage information for the vehicle. The usage information may characterize usage of the vehicle by one or more persons, such as a driver of the vehicle or one or more passengers of the vehicle. A monitoring event may be detected based on the usage information. A monitoring event may refer to an event that indicates desirability of monitoring (by a person, by a sensor, such as a camera). Responsive to detection of the monitoring event, one or more lights of the vehicle may be controlled. For example, a monitoring event may include a passenger approaching the vehicle, the passenger entering the vehicle, or the passenger exiting the vehicle, and one or more lights of the vehicle may be turned on to assist and monitor the passenger's approach of, entry into, or exit out of the vehicle.

One or more cameras of the vehicle may be controlled to capture one or more images and/or one or more videos of the monitoring event. The image(s) and/or the video(s) may be analyzed to perform one or more monitoring functions. A monitoring function may refer to a function that monitors the usage of the vehicle. For example, a monitoring function may include a passenger identification confirmation, a seatbelt usage confirmation, a passenger entry confirmation, a passenger departure confirmation, or a post-passenger departure cabin check. A post-passenger departure cabin check may include determination of whether one or more objects (e.g., mobile device, luggage, wallet, trash) have been left in the vehicle by the passenger (after completion of the ride, after exiting the vehicle).

The cameras of the vehicle may be positioned such that individual cameras are within each other's field of view. For example, a vehicle may include two cameras, and the two cameras may be positioned within the vehicle such that a field of view of one camera (first camera) includes the other camera (second camera) and a field of view of the other camera includes the one camera. The cameras being positioned within fields of view of other cameras may be used to detect a tampering event (an event in which a person tampers with a camera). For example, a tampering event for the first camera may be detected based on one or more images and/or one or more videos captured by the second camera, while a tampering event for the second camera may be detected based on one or more images and/or one or more videos captured by the first camera. Responsive to detection of a tampering event, one or more alerts may be generated. Responsive to detection of a tampering event, one or more warnings may be provided to the person(s) engaged in the tampering event.

The approaches disclosed herein provides for automatic control of lights to monitor usage of a vehicle. When a person is approaching a vehicle, entering the vehicle, is inside the vehicle, and/or is exiting the vehicle, it may be useful for the person to be provided with light to make it easier for the person to interact with the vehicle. The light may be also used to facilitate monitoring, by another person and/or a sensor, the person's usage of the vehicle.

FIG. 1 illustrates an example environment 100 for determining user response to simulation of driving experience, in accordance with various embodiments. The example environment 100 may include a computing system 102, a sensor 120, a display 130, a speaker 140, and a light source 150. The computing system 102 may be communicatively, electrically, and/or mechanically coupled to one or more components of the environment 100. For example, the computing system 102 may be coupled to the sensor 120, the display 130, the speaker 140, and/or the light source 150 to facilitate monitoring of vehicle usage. The coupling between the different components within the environment 100 may include direct coupling and/or indirect coupling.

While components 102, 120, 130, 140, 150 of the environment 100 are shown in FIG. 1 as single entities, this is merely for ease of reference and is not meant to be limiting. For example, one or more components/functionalities of the computing system 102 described herein may be implemented, in whole or in part, within a single computing device or within multiple computing devices. The sensor 120, the display 130, the speaker 140, and/or the light source 150 may include a single tool/component or multiple tools/components that provide functionalities described herein. For example, the sensor 120 may include a single sensor, multiple sensors of the same type, or different types of sensors. As another example, the light source 150 may include one or more light sources within a vehicle and/or one or more light sources outside the vehicle.

The sensor 120 may refer to a tool or a device that monitors (e.g., measure, ascertain, detect, estimate) one or more physical properties. A sensor may record, indicate, and/or otherwise respond to the measured physical propert(ies). For example, the sensor 120 may include one or more image sensor, one or more sound sensors, one or more vehicle sensors, and/or other sensors. An image sensor may include a sensor (e.g., camera, sensor within a camera) that detects and/or conveys information that constitutes an image or a video. The image sensor may be configured to capture image(s) and/or video(s) of one or more persons (e.g., driver, passenger) inside the vehicle and/or outside the vehicle. The image(s) and/or video(s) of the person(s) may depict how the person(s) is acting and/or has acted. A sound sensor may include a sensor (e.g., microphone, sensor within a microphone) that detects and/or conveys information that constitutes sound or audio. The sound sensor may be configured to capture sound and/or audio of one or more persons (e.g., driver, passenger) inside the vehicle and/or outside the vehicle. The sound and/or audio of the person(s) may convey information on how the person(s) is acting or has acted. A vehicle sensor may refer to a sensor that monitors one or more status, and/or one or more operations of a vehicle. A vehicle sensor may generate signals and/or information that conveys information on the status of the vehicle (e.g., turned on, turned off), operation of the vehicle (e.g., stopped, moving, speed of movement, direction of movement), and/or other information about the vehicle. Use of other sensors are contemplated.

The sensor 120 may be positioned within, positioned outside, carried by, and/or affixed to a vehicle to monitor one or more physical properties within and/or outside the vehicle. The sensor 120 may be positioned to monitor usage of the vehicle by one or more persons (e.g., drivers, passengers, other persons). Usage of a vehicle may refer to the action or the way in which the vehicle is being used. Usage of a vehicle may include anticipated use of the vehicle, actual use of the vehicle, and/or actions after actual use of the vehicle. Usage of a vehicle may include one or more interactions of a person with the vehicle. For example, the sensor 120 may monitor how and/or whether a person is approaching the vehicle, how and/or whether a person is entering the vehicle, how a person is acting inside the vehicle, status of a person inside the vehicle, how and/or whether a person is exiting the vehicle, and/or how and/or whether a person is moving away from the vehicle, and/or how a person is acting outside the vehicle. The sensor 120 may monitor how and/or whether the vehicle is being operated with one or more particular persons being inside the vehicle and/or outside the vehicle. Vehicle usage monitoring by the sensor 120 may include the sensor 120 generating information about the vehicle usage. For example, the sensor 120 may include one or more cameras that capture images and/or videos showing usage of the vehicle by one or more persons. As another example, the sensor 120 may include one or more microphones that capture sound and/or audio of usage of the vehicle by one or more persons. As yet another example, the sensor 120 may include one or more vehicle sensors that monitor status and/or operation of the vehicle. Information generated by the sensor 120 may be used to perform one or more monitoring functions.

The display 130 may refer to a tool or a device that visually presents information (e.g., displaying one or more images, one or more videos, one or more text, one or more graphics, and/or other visual information). The display 130 may be positioned within, positioned outside, carried by, and/or affixed to a vehicle. The display 130 may present visual information itself (e.g., the display 130 includes a monitor) and/or may present visual information using a projecting surface (e.g., the display 130 includes a projector). The display 130 may refer to a single device (e.g., single monitor) or multiple devices (e.g., multiple monitors) working in coordination to display visual information. The display 130 may act as a light source (e.g., the light source). For example, the display may be turned on and/or the brightness of the display may be increased to act as a light source.

The speaker 140 may refer to a tool or a device that audibly presents information (e.g., playing recorded and/or simulated audio/sound). The speaker 140 may be positioned within, positioned outside, carried by, and/or affixed to a vehicle. The speaker 140 may refer to a single device (e.g., single speaker) or multiple devices (e.g., multiple speakers) working in coordination to present audible information. The speaker 140 may include one or more transducers that convert electrical signals into sound waves.

The light source 150 may refer to a tool or a device that provides light. The light source 150 include one or more sources of electro-magnetic radiation. The light source 150 may provide light in one or more particular directions. The light source 150 may provide light omnidirectionally. The light source 150 may provide light in one or more frequencies and/or one or more ranges of frequencies. The light source 150 may include one or more of a light-emitting diode, a fluorescent lamp/bulb, halogen lamp/bulb, metal halide lamp/bulb, high pressure solidum lamp/bulb, low pressure solidum lamp/bulb, and/or other light sources. The light source 150 may be positioned within, positioned outside, carried by, and/or affixed to a vehicle. The light source 150 may be part of a vehicle or separate from the vehicle.

The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution. The computing system 102 may include a vehicle usage engine 112, a monitoring event engine 114, a control engine 116, and/or other engines.

In various embodiments, the vehicle usage engine 112 may be configured to obtain usage information for a vehicle. Obtaining usage information may include accessing, acquiring, analyzing, determining, examining, generating, identifying, loading, locating, opening, receiving, retrieving, reviewing, storing, and/or otherwise obtaining the usage information. Usage information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Usage information may be stored within a single file or across multiple files.

A vehicle may refer to a thing used to transport one or more persons and/or one or more things. Examples of vehicle may include an autonomous vehicle, a non-autonomous vehicle, a taxi, a ride-share vehicle, a vehicle owned by an organization, a personally owned vehicle, and/or other vehicles.

Usage information may characterize usage of the vehicle by one or more persons. For example, the usage information may characterize usage of the vehicle by one or more drivers of the vehicle, one or more passengers of the vehicle, and/or other persons. The person(s) may include person(s) inside the vehicle and/or person(s) outside the vehicle. For example, the usage information may characterize usage of the vehicle by one or more persons inside the vehicle, one or more persons entering the vehicle, one or more persons exiting the vehicle, and/or one or more persons outside the vehicle. Usage of a vehicle by a person may refer to the action taken or the way in which the vehicle is being used by the person. Usage of a vehicle by a person may include one or more interactions of the person with the vehicle. Usage of a vehicle by a person may refer to an action or a way in which the vehicle and/or one or more portions of the vehicle is being used by the person, has been used by the person, and/or is being anticipated to be used by the person.

Usage information may be generated and/or determined based on operation of one or more sensors (e.g., the sensor 120), communication between devices, and/or other information. For example, usage information that characterizes how a person is approaching the vehicle, how and/or whether a person is entering the vehicle, how a person is acting inside the vehicle, status of a person inside the vehicle, how and/or whether a person is exiting the vehicle, and/or how and/or whether a person is moving away from the vehicle, and/or how a person is acting outside the vehicle may be generated and/or determined based on one or more image sensors, one or more sound sensors, and/or other sensors. As another example, usage information that characterizes the distance between a person and a vehicle may be generated and/or determined based on operation of one or more position sensors, one or more proximity sensors, and/or other sensors. For instance, the location of the vehicle may be determined based on communication with and/or information received from a GPS of the vehicle and the location of the person may be determined based on communication with and/or information received from a GPS of the person (e.g., GPS inside a mobile device carried by the person). Based on the location of the vehicle and the location of the person, the distance between the person and the vehicle may be determined. As yet another example, usage information that characterizes status of the vehicle operation with respect to a person may be generated and/or determined based on operation of one or more vehicle sensors and/or communication with mobile device of the person. For instance, a person may be riding a taxi or a ride-sharing vehicle, and the status of the vehicle (e.g., whether the trip has started, the progress of the vehicle along the trip, whether the vehicle is approaching the end of the trip, whether the vehicle has reached the end of the trip) may be generated and/or determined based on information generated by a vehicle sensor and/or communication with a mobile device of the person that is running a ride-sharing app. Other generation and/or determination of usage information are contemplated.

In various embodiments, the monitoring event engine 114 may be configured to detect one or more monitoring events based on the usage information and/or other information. A monitoring event may refer to an event that indicates desirability of monitoring (by a person, by a sensor, such as a camera). A monitoring event may include an event for which monitoring is desired (e.g., a camera is used to monitor the monitoring event) and/or an event that indicates that an event for which monitoring is desired is happening and/or will happen (e.g., a camera, a microphone, and/or a vehicle sensor is used to monitor an event that will follow the monitoring event). For example, a monitoring event for a vehicle may include one or more of the following events: a person (e.g., driver, passenger, another person) approaching the vehicle, a person entering the vehicle, a person exiting the vehicle, a person taking a particular action inside or outside the vehicle, a person taking a particular action with respect to the vehicle or a person inside the vehicle, the vehicle approaching the position of a person, the vehicle starting a trip for a person, the vehicle approaching the end of the trip for a person, the vehicle reaching the end of the trip for a person. Other monitoring events are contemplated.

In various embodiments, the control engine 116 may be configured to control one or more lights of a vehicle. The control engine 116 may directly control a light (e.g., communicate directly with the light to turn on the light, turn off the light, control brightness/color of the light) or indirectly control the light (e.g., communicate with a device that control the light, communicate with a device connected to the light). A light of a vehicle may refer to a tool or a device, such as the light source 150, of the vehicle that provides light. For example, the light source 150 may be controlled to provide light inside the vehicle and/or outside the vehicle. In some embodiments, one or more lights separate from the vehicle (e.g., street light) may be controlled.

Provision of light by the light(s) of the vehicle may facilitate monitoring of the vehicle and/or one or more persons. For example, lack of light (e.g., nighttime) may make it difficult to monitor operation of the vehicle and/or how one or more persons are acting with respect to the vehicle. The control engine 116 may, responsive to detection of one or more monitoring events, control the light(s) of the vehicle to provide light. Provision of light may also facilitate usage of the vehicle by one or more persons.

For instance, a monitoring event for a vehicle may include a person approaching the vehicle, a person entering the vehicle, a person exiting the vehicle, a person taking a particular action inside or outside the vehicle, a person taking a particular action with respect to the vehicle or a person inside the vehicle, and the light(s) of the vehicle may be turned on, adjusted (e.g., brightness, color), and/or otherwise controlled by the control engine 116 to assist the person's usage of the vehicle while facilitating monitoring of the person's usage of the vehicle. For example, responsive to detecting that the vehicle is approaching a passenger of the vehicle, the vehicle's interior light may be turned on to indicate to the passenger the identity of the vehicle as the one in which the person is going to ride. The interior light of the vehicle may also reveal to the passenger whether any other persons (besides the driver) is inside the vehicle. The interior light and/or other lights may help the driver of the vehicle and/or one or more cameras of the vehicle to monitor the passenger's approach of and/or entry into the vehicle. The interior light may also help the passenger's entry into the vehicle and other actions inside the vehicle (e.g., locating and buckling the seatbelt). The light may provide other information to the person(s). For example, the interior light may remain turned on until the passenger has buckled the seatbelt. The interior light being on may indicate to the passenger and/or other(s) (e.g., driver, a person remotely monitoring the vehicle via a camera of the vehicle) that the passenger has not buckled the seatbelt. The control engine 116 may control the light(s) (e.g., turn off the light(s) and/or lower the light) responsive to the completion of the monitoring event (e.g., passenger entering the vehicle and buckling the seatbelt).

As another example, responsive to detecting that the vehicle is approaching the end of a trip or has reached the end of the trip for a passenger, the vehicle's interior light may be turned on to indicate to the passenger that the trip is ending or has ended. The interior light of the vehicle may assist the passenger's exit out of the vehicle and/or other actions inside the vehicle (e.g., unbuckling the seatbelt, gathering personal belongings). The interior light and/or other lights may help the driver of the vehicle and/or one or more cameras of the vehicle to monitor the passenger's exit out of and movement away from the vehicle.

The light(s) of the vehicle may include universal light or individualized lights. For example, referring to the example of the passenger's approach of and entry into the vehicle, a universal light that is controlled may include an interior light of the vehicle intended to provide light for multiple seats inside the vehicle and/or an exterior light of the vehicle intended to light up the vehicle. As another example, an individual light that is controlled may include an interior light of the vehicle intended to provide light for particular seat(s) inside the vehicle and/or an exterior light of the vehicle intended to light up a particular side of the vehicle. For instance, based on the passenger being expected to occupy a right and rear seat of the vehicle, a light that provides light for the right and rear seat of the vehicle and/or a light that lights up the right and rear side of the vehicle may be turned on, and provide light for the passenger to occupy the right and rear seat as well as indicating to the passenger in which seat the passenger may seat. If there are other passengers in the vehicle, such usage of individualized lights may be less intrusive to such passenger(s) than the usage of universal lights. Such control of the light(s) of the vehicle may be used to provide lighting for passenger monitoring functions during the times when the passenger may also require lighting to use the vehicle.

One or more sensors of the vehicle may be controlled to monitor usage of the vehicle by one or more persons. A sensor of a vehicle may refer to a tool or a device, such as the sensor 120, of the vehicle that monitors (e.g., measure, ascertain, detect, estimate) one or more physical properties. For example, the sensor 120 may be controlled to provide monitor usage of the vehicle by one or more persons inside the vehicle and/or outside the vehicle. For instance, one or more cameras and/or one or more microphones of the vehicle may be controlled (e.g., turned on, selecting an operating mode, directing sensor operation) to capture one or more images, one or more videos, and/or one or more sound/audio of the monitoring event and/or other event.

The content captured by the sensor(s) (e.g., image(s), video(s), and/or sound/audio) may be used to monitor one or more persons' usage of the vehicle. For example, the image(s), the video(s), and/or the sound/audio captured by the sensor(s) may be analyzed to perform one or more monitoring functions. A monitoring function may refer to a function that monitors the usage of the vehicle. A monitoring function may include one or more operations for observing and/or checking things inside and/or outside the vehicle. For example, a monitoring function may include one or more of the following: a passenger identification confirmation, a seatbelt usage confirmation, a passenger entry confirmation, a passenger departure confirmation, a post-passenger departure cabin check. A passenger identification confirmation may include checking the identity of a passenger inside the vehicle (e.g., via one or more images of the passenger's face, one or more biometric readings of the passenger) to confirm that the expected/correct passenger has entered the vehicle and/or is riding a trip inside the vehicle. A seatbelt usage confirmation may include determination of whether a person inside the vehicle has buckled the seatbelt and/or otherwise properly engaged the seatbelt. A passenger entry confirmation may include determination of whether a passenger is entering and/or has entered the vehicle. A passenger departure confirmation may include determination of whether a passenger is and/or has exited the vehicle. A post-passenger departure cabin check may include determination of whether one or more objects (e.g., mobile device, luggage, wallet, trash) have been left in the vehicle by the passenger (after completion of the ride, after exiting the vehicle).

Figure 2:
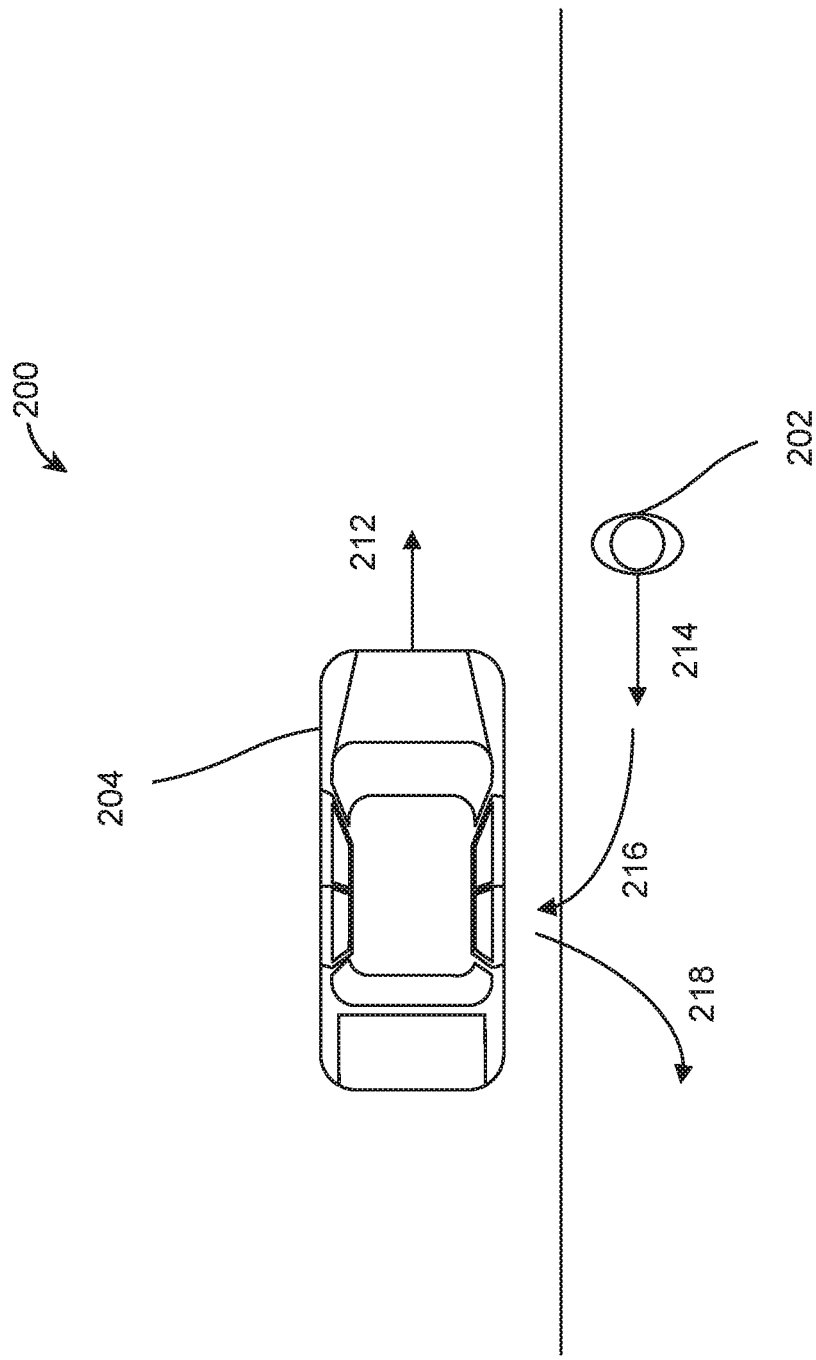
FIG. 2 illustrates an example environment for monitoring usage of a vehicle, in accordance with various embodiments.

FIG. 2 illustrates an example environment 200 for monitoring usage of a vehicle, in accordance with various embodiments. The environment 200 may include a passenger 202 and a vehicle 204. The passenger may be approaching 214 the vehicle 204. The vehicle 204 may be moving in a direction 212. The vehicle 204 may stop, and the passenger 202 may enter 214 the vehicle 204 or exit 218 the vehicle 214. One or more lights of the vehicle may be controlled based on usage of the vehicle 204 by the person 202. The light(s) may help the driver of the vehicle 204, other persons (e.g., remote operator monitoring usage of the vehicle 204), and/or one or more sensors to monitor the usage of the vehicle 204.

For example, based on the person 202 being a passenger of the vehicle 204 and approaching the vehicle 204, a light of the vehicle (e.g., interior vehicle light, exterior vehicle light) may be turned on. The light may help the person 202 identify the vehicle 204 (e.g., as the appropriate ride-sharing vehicle), enter 216 the vehicle 204, and/or use one or more portions of the vehicle 204 (e.g., find seating inside the vehicle 204, use the seatbelt of the vehicle). As another example, based on the vehicle 204 approaching the end of the trip for a person inside the vehicle 204, a light of the vehicle 204 (e.g., interior vehicle light, exterior vehicle light) may be turned on. The light may indicate the end/near end of the trip to the person. The light may help the person gather belonging(s) inside the vehicle 204, exit 218 the vehicle 204, and/or move away from the vehicle 204.

Figure 3:
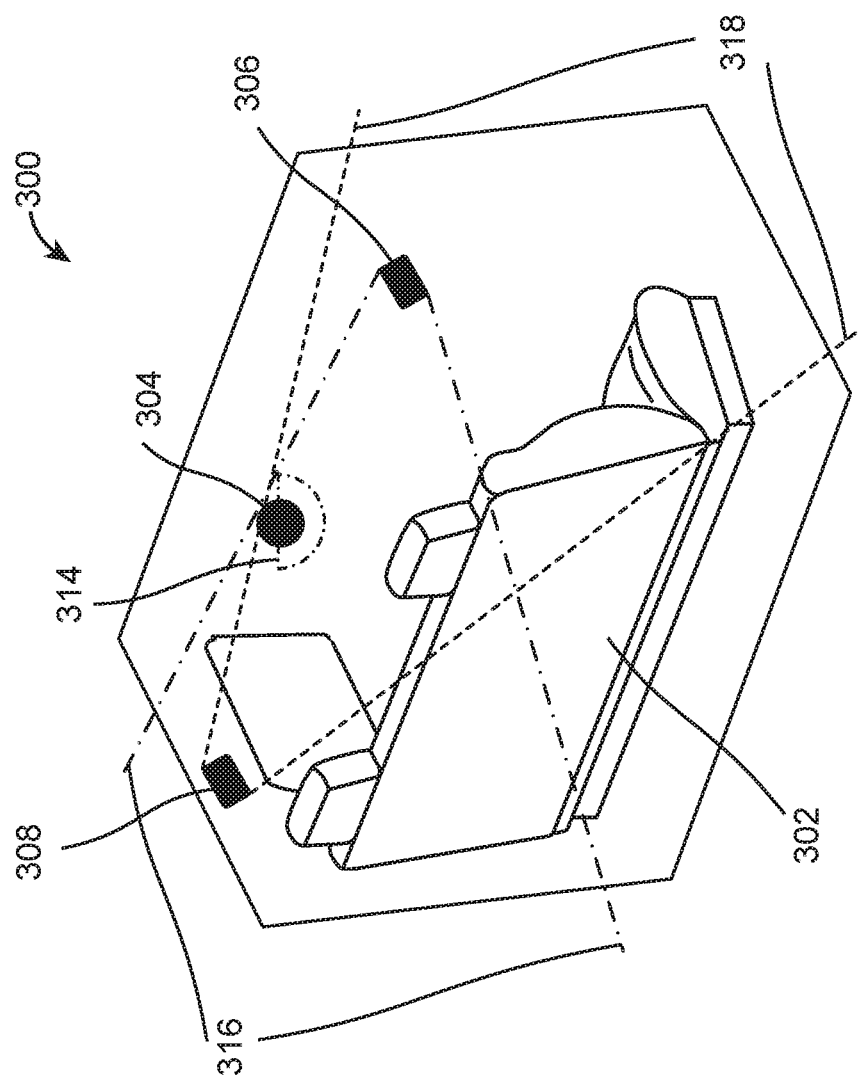
FIG. 3 illustrates an example environment for monitoring usage of a vehicle, in accordance with various embodiments.

FIG. 3 illustrates an example environment 300 for monitoring usage of a vehicle, in accordance with various embodiments. The environment 300 may include a cabin of a vehicle with rear seat 302 and multiple sensors to monitor activity inside the cabin, such as cameras 304, 306, 308. The cameras 304, 306, 308 of the vehicle may be positioned such that individual cameras are within the field of view of at least one other camera. The field of view of a camera may refer to an extent of the observable world that is seen by the camera. For example, the camera 304 (positioned on vehicle ceiling) may include a hemispherical viewing field 314 (e.g., 180-degrees field of view). The hemispherical viewing field 314 may include the cameras 306, 308. The camera 306 (positioned on right side of the vehicle) may include a viewing field 316, which may include the cameras 304, 308. The camera 308 (positioned on left side of the vehicle) may include a viewing field 318, which may include the cameras 304, 306. Other types of sensors, other numbers of sensors, and other placement of sensors are contemplated.

The cameras being positioned within fields of view of other cameras may be used to detect a tampering event. A tampering event may refer to an event in which one or more person tampers and/or attempts to tamper with a camera. For example, a tampering event for the camera 304 may be detected based on one or more images and/or one or more videos captured by the camera 306 and/or the camera 308, a tampering event for the camera 306 may be detected based on one or more images and/or one or more videos captured by the camera 304 and/or the camera 308, and a tampering event for the camera 308 may be detected based on one or more images and/or one or more videos captured by the camera 304 and/or the camera 306. Responsive to detection of a tampering event, one or more alerts may be generated. A alert may indicate to a person and/or a computing device that a camera is being tampered. Responsive to detection of a tampering event, a warning may be provided to the person(s) engaged in the tampering event. The warning may be visually provide via one or more displays (e.g., the display 130). The warning may be audibly provided via one or more speakers (e.g., the speaker 140). Other provisions of warning are contemplated.

Figure 4:
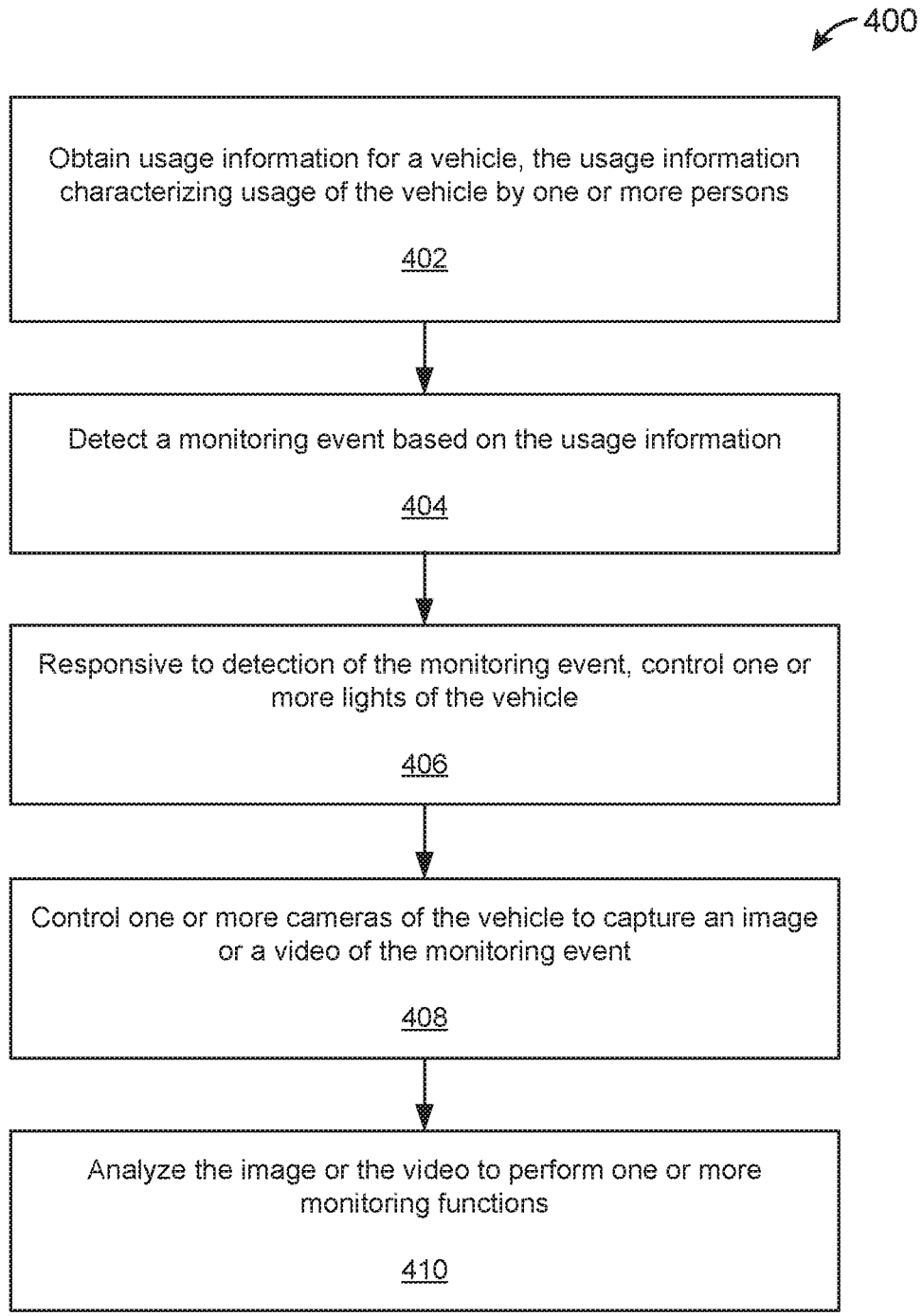
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, usage information for a vehicle may be obtained. The usage information may characterize usage of the vehicle by one or more persons. At block 404, a monitoring event may be detected based on the usage information. At block 406, responsive to detection of the monitoring event, one or more lights of the vehicle may be controlled. At block 408, one or more cameras of the vehicle may be controlled to capture an image or a video of the monitoring event. At block 410, the image or the video may be analyzed to perform one or more monitoring functions.

HARDWARE IMPLEMENTATION

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
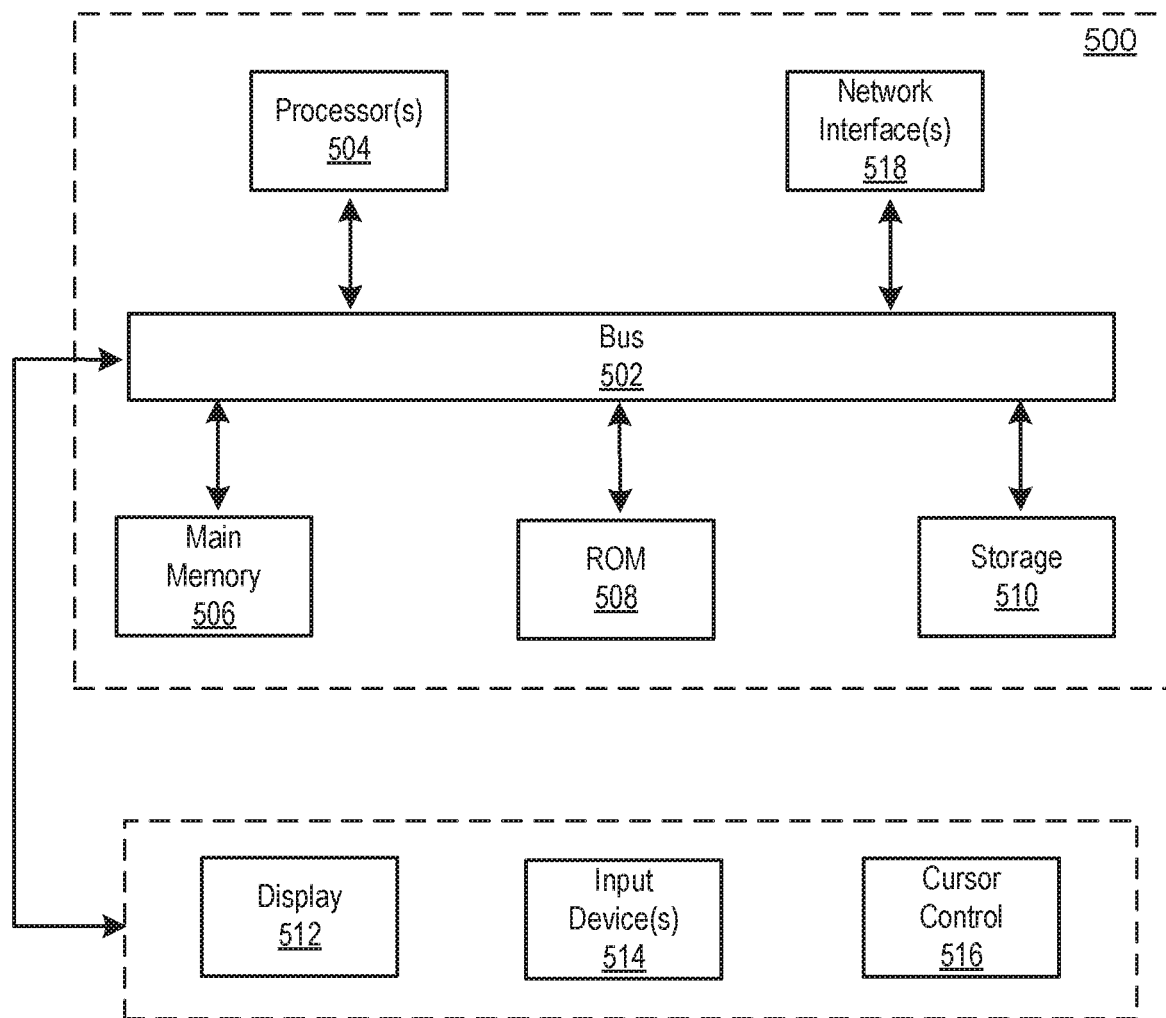
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system, comprising:
   one or more processors; and
   a memory storing instructions that, when executed by the one or more processors, cause the system to perform operations comprising:
      obtaining usage information for a vehicle, the usage information characterizing usage of the vehicle by one or more persons including a first person;
      detecting a monitoring event based on the usage information, wherein the monitoring event comprises the first person approaching the vehicle;
      anticipating, prior to the first person accessing the vehicle, a first interior portion of the vehicle to be occupied by the first person;
      controlling one or more cameras of a plurality of cameras of the vehicle to capture an image or a video of the monitoring event, wherein the plurality of cameras includes a first camera and a second camera, the first camera and the second camera positioned within the vehicle such that a first field of view of the first camera includes the second camera and a second field of view of the second camera includes the first camera;
      responsive to detection of the monitoring event, and based at least in part on the anticipating, selectively controlling a light source to illuminate the first interior portion of the vehicle, wherein the light source is positioned so as to target light to the first interior portion of the vehicle;
      detecting a first tampering event for the first camera based on an image or a video captured by the second camera;
      detecting a second tampering event for the second camera based on an image or a video captured by the first camera; and
      responsive to detection of the first tampering event or the second tampering event, generating an alert.

2. The system of claim 1, wherein the image or the video is analyzed to perform one or more monitoring functions.

3. The system of claim 2, wherein the one or more monitoring functions include a passenger identification confirmation, a seatbelt usage confirmation, a passenger entry confirmation, a passenger departure confirmation, or a post-passenger departure cabin check.

4. The system of claim 3, wherein the post-passenger departure cabin check includes determination of whether one or more objects have been left in the vehicle by a passenger of the vehicle.

5. The system of claim 1, wherein anticipating the first interior portion of the vehicle to be occupied by the first person comprises anticipating the first interior portion of the vehicle to be occupied by the first person based at least in part on a direction of approach of the first person to the vehicle.

6. The system of claim 1, wherein execution of the stored instructions by the one or more processors further causes the system to perform:
   determining a second interior portion of the vehicle occupied by a second person of the one or more persons,
   wherein anticipating the first interior portion of the vehicle to be occupied by the first person comprises anticipating the first interior portion of the vehicle to be occupied by the first person based at least in part on the determined second interior portion of the vehicle occupied by the second person.

7. The system of claim 1, wherein the one or more persons comprises at least a second person occupying the vehicle prior to the first person entering the vehicle, and wherein execution of the stored instructions by the one or more processors further causes the system to perform:
   providing the first person with information that identifies illumination of the first interior portion of the vehicle as indicating an intent for the first person to occupy the first interior portion of the vehicle.

8. The system of claim 1, wherein execution of the stored instructions by the one or more processors further causes the system to perform:
   detecting a seatbelt buckling event corresponding to a seatbelt associated with the first interior portion of the vehicle; and
   controlling the light source to cease illumination of the first interior portion of the vehicle,
   wherein the light is controlled to continuously illuminate the first interior portion of the vehicle until the seatbelt buckling event is detected.

9. A method implemented by a computing system including one or more processors and storage media storing machine-readable instructions, wherein the method is performed using the one or more processors, the method comprising:
obtaining usage information for a vehicle, the usage information characterizing usage of the vehicle by one or more persons including a first person;
detecting a monitoring event based on the usage information, wherein the monitoring event comprises the first person approaching the vehicle;
anticipating, prior to the first person accessing the vehicle, a first interior portion of the vehicle to be occupied by the first person;
controlling one or more cameras of a plurality of cameras of the vehicle to capture an image or a video of the monitoring event, wherein the plurality of cameras includes a first camera and a second camera, the first camera and the second camera positioned within the vehicle such that a first field of view of the first camera includes the second camera and a second field of view of the second camera includes the first camera;
responsive to detection of the monitoring event, and based at least in part on the anticipating, selectively controlling a light source to illuminate the first interior portion of the vehicle, wherein the light source is positioned so as to target light to the first interior portion of the vehicle;
detecting a first tampering event for the first camera based on an image or a video captured by the second camera;
detecting a second tampering event for the second camera based on an image or a video captured by the first camera; and
responsive to detection of the first tampering event or the second tampering event, generating an alert.

10. The method of claim 9, wherein the image or the video is analyzed to perform one or more monitoring functions.

11. The method of claim 10, wherein the one or more monitoring functions include a passenger identification confirmation, a seatbelt usage confirmation, a passenger entry confirmation, a passenger departure confirmation, or a post-passenger departure cabin check.

12. The method of claim 11, wherein the post-passenger departure cabin check includes determination of whether one or more objects have been left in the vehicle by a passenger of the vehicle.

13. A non-transitory computer readable medium comprising instructions that, when executed, cause one or more processors to perform:
obtaining usage information for a vehicle, the usage information characterizing usage of the vehicle by one or more persons including a first person;
detecting a monitoring event based on the usage information, wherein the monitoring event comprises the first person approaching the vehicle;
anticipating, prior to the first person accessing the vehicle, a first interior portion of the vehicle to be occupied by the first person;
controlling one or more cameras of a plurality of cameras of the vehicle to capture an image or a video of the monitoring event, wherein the plurality of cameras includes a first camera and a second camera, the first camera and the second camera positioned within the vehicle such that a first field of view of the first camera includes the second camera and a second field of view of the second camera includes the first camera; and
responsive to detection of the monitoring event, and based at least in part on the anticipating, selectively controlling a light source to illuminate the first interior portion of the vehicle, wherein the light source is positioned so as to target light to the first interior portion of the vehicle;
detecting a first tampering event for the first camera based on an image or a video captured by the second camera;
detecting a second tampering event for the second camera based on an image or a video captured by the first camera; and
responsive to detection of the first tampering event or the second tampering event, generating an alert.

14. The method of claim 9, wherein anticipating the first interior portion of the vehicle to be occupied by the first person comprises anticipating the first interior portion of the vehicle to be occupied by the first person based at least in part on a direction of approach of the first person to the vehicle.

15. The method of claim 9, further comprising:
determining a second interior portion of the vehicle occupied by a second person of the one or more persons,
wherein anticipating the first interior portion of the vehicle to be occupied by the first person comprises anticipating the first interior portion of the vehicle to be occupied by the first person based at least in part on the determined second interior portion of the vehicle occupied by the second person.

16. The method of claim 9, wherein the one or more persons comprises at least a second person occupying the vehicle prior to the first person entering the vehicle, the method further comprising:
providing the first person with information that identifies illumination of the first interior portion of the vehicle as indicating an intent for the first person to occupy the first interior portion of the vehicle.

17. The method of claim 9, further comprising:
detecting a seatbelt buckling event corresponding to a seatbelt associated with the first interior portion of the vehicle; and
controlling the light source to cease illumination of the first interior portion of the vehicle,
wherein the light is controlled to continuously illuminate the first interior portion of the vehicle until the seatbelt buckling event is detected.

* * * * *